United States Patent Office

3,737,524
Patented June 5, 1973

3,737,524
MEDICAMENTS DERIVED FROM NUCLEIC ACIDS, PROCESSES FOR THEIR PREPARATION AND THEIR USE
Jean Pierre Ebel, Strasbourg, Louis Eugene Marie Colobert, Collonges au Mont d'Or, and Pierre Louisot, Lyons, France, assignors to Ugine Kuhlmann, Paris, France
No Drawing. Filed Oct. 20, 1970, Ser. No. 82,556
Claims priority, application France, Oct. 21, 1969, 6935974
Int. Cl. A61k 27/00
U.S. Cl. 424—180                                9 Claims

ABSTRACT OF THE DISCLOSURE

Medicaments consisting of or containing chemically modified ribonucleic or deoxyribonucleic acids of human origin. These medicaments may be manufactured by subjecting ribonucleic or deoxyribonucleic acids extracted from tissues of human origin to a chemical reaction under conditions such that the general structure of these acids is not profoundly modified but such that the purine and pyrimidine bases which constitute them undergo modifications. The medicaments are useful for the treatment of a human being having an infection of viral origin.

---

The present invention relates to ribonucleic acid (RNA) and deoxyribonucleic acid (DNA) extracted from human tissues and chemically modified, to processes for their preparation, to new medicaments containing them and to their use in the treatment of viral infections.

Ribonucleic acids extracted from yeast have already been proposed as medicaments able to confer a resistance to respiratory infections of viral origin.

It has been found in the course of preliminary work that the various varieties of ribonucleic or deoxyribonucleic acids, singly or in admixture, which have been extracted from the tissues of a given animal species (for example calves kidney or chicken embryos) and which have then been treated so that the purine or pyrimidine bases which enter into their composition are subjected to chemical modifications such as for example alkylation, halogenation, acetylation, action of nitrous acid or oxidation, show the property of making the cells or tissues of the same animal species as that from which these modified nucleic acids were originally extracted particularly resistant to various infections, when the said cells or tissues are treated with these modified nucleic acids.

Thus the ribonucleic acids extracted from calves kidney, then methylated, and introduced into a culture medium where the cells of calves kidney multiply in vitro, prevent the Myxovirus Parainfluenzae I (virus Sendai) from multiplying in these cells. Such multiplication is produced in the culture medium in the absence of modified nucleic acids or in the presence of the same nucleic acids, which have not been chemically modified. This fact has been shown in the following way: the "total" ribonucleic acids extracted from calves kidney cells are methylated by means of 4 moles of methyl sulphate per nucleotide in the reaction medium, and are then put in contact with the cells in the culture for 1 hour at 37° C. before the inoculation with the virus Sendai. These nucleic acids thus methylated inhibit the viral development in a marked manner. If the concentration of the solution of methylated nucleic acids reaches $70.10^{-6}$ g./ml. or more, inhibition of the viral multiplication is complete.

This phenomenon is correlated with the appearance in the calves' kidney cells of substances known in the scientific literature as "interferons," but the possible intervention of other factors in the protective phenomenon is not excluded.

Analogous manifestations have been observed in the case where the ribonucleic acids have been extracted from chicken and where the virus studied is the Sindbis virus known to multiply easily in chicken fibroblasts. Here again, when the modified ribonucleic acids are introduced into the culture medium at a dose of $100.10^{-6}$ g./ml. the inhibiting effect on the viral multiplication is very great, and this affect becomes total when the concentration used is aqual to $200.10^{-6}$ g./ml. or more.

In the tests mentioned above, the ribonucleic acids used were the "total" ribonucleic acids, i.e. mixtures of the different kinds of ribonucleic acids existing in the cells, especially the ribosomal and transfer nucleic acids. These two varieties of ribonucleic acids have been separated from one another. After methylation, it was found that, at the same weight concentrations, each of them showed exactly the same biological properties as the mixtures.

The influence of the various chemical modifications applied to the ribonucleic acids (ribosomal on the one hand, and transfer on the other hand, prepared from chicken) on the multiplication of the virus Sindbis has been studied. An inhibiting effect was found in every case, whatever the chemical transformation: methylation, allylation, acetylation, deamination by nitrous acid, oxidation by monoperphthalic acid, bromination, chlorination or iodination. For a given variety of modified ribonucleic acid, the inhibiting effect found becomes more marked as the quantity of modified nucleic acid introduced into the cellular culture medium is higher, up to a limit of concentration for which the maximal inhibiting effect is attained. The optimal concentration varies according to the case between $20.10^{-6}$ g./ml. and $100.10^{-6}$ g./ml.

The properties conferring the resistance towards viral multiplication, such as are described above, are moreover not peculiar to the modified ribonucleic acids; they belong equally to the deoxyribonucleic acids when these have undergone analogous chemical treatments, especially methylation. It has thus been found that the development of the Sindbis virus is inhibited in the fibroblasts of chicken when these said fibroblasts have been in contact for two hours at 37° C. with a solution of 9 grammes of sodium chloride per litre containing concentrations between $10.10^{-6}$ g./ml. and $50.10^{-6}$ g./ml. of deoxyribonucleic acid extracted from chicken, then methylated. In the same way, deoxyribonucleic acid, methylated by methyl sulphate at the rate of 4 moles per nucleotide in the reaction medium, shows the same activity as the deoxyribonucleic acid methylated by 6 moles of methyl sulphate per nucleotide, although the "native" deoxyribonucleic acid not having undergone the methyl sulphate treatment is ineffective. Finally, it has been found that deoxyribonucleic acid, for the same concentration by weight, shows an effect inductive of resistance to the viral development identical to that of the ribonucleic acids methylated by means of 4 moles of methyl sulphate per nucleotide. A concentration of $50.10^{-6}$ g./ml. is sufficient to inhibit to 80% the multiplication of the virus.

The properties of the modified ribonucleic acids and those of the modified deoxyribonucleic acids being analogous, the question of whether this is also the case with a mixture of the two varieties was examined. It was found that there is no difference between the modified ribonucleic acid, the modified deoxyribonucleic acid and the modified mixture of deoxyribonucleic acid (30%) and ribonucleic acid (70%) extracted from chicken with respect to their inhibiting effect on the development of the Sindbis virus in the chicken fibroblasts at the same concentrations by weight. The modification was obtained by the action of 4 moles of methyl sulphate per nucleotide.

From these studies it is evident that the natural substances known as "nucleic acids," extracted from the tissues of a given animal species, are capable of inducing in the cells of the same animal species a state of resistance towards various viral infections when these substances have undergone various chemical modifications capable of altering the purine or pyrimidine bases which enter into their composition. It has now been found that the same applies in the case of the human species, and that the nucleic acids of human origin, singly or in admixture, such as may be prepared, for example, from blood leucocytes or placental tissues, after they have been chemically modified, are capable when used therapeutically in man of increasing resistance to a wide variety of viral infections, especially those known to be sensitive to substances of the "interferon" type. One can therefore either prevent an infection by a suitable treatment during the incubation period or favourably modify the course of the infection.

By means of the present invention compositions may be obtained which have a greater activity in conferring resistance to respiratory infections of viral origin than the ribonucleic acid extracts from yeast mentioned above.

The present invention includes a process for the preparation of new medicaments which comprises subjecting the ribonucleic and deoxyribonucleic acids extracted from human tissues, singly or in admixture, to chemical reactions such as for example alkylation, especially methylation or ethylation, allylation, acylation, especially acetylation, deamination, oxidation or halogenation. The essential characteristic of the invention does not lie in particular chemical reactions applied to nucleic acids but, in a general manner, to all chemical reactions applied to the ribonucleic and deoxyribonucleic acids extracted from human tissues provided that they do not profoundly modify the general structure of these acids, but yet cause modifications in the purine or pyrimidine bases constituting these acids.

The extraction of the ribonucleic and deoxyribonucleic acids from tissues of human origin may be effected for example by any known process, especially by means of phenol, phenol saturated with water, or phenol saturated with buffer solutions. After extraction of the tissues, the subsequent chemical reaction may be applied either to the "total" ribonucleic or deoxyribonucleic acids, or to the particular acids isolated therefrom such as the ribosomal or transfer nucleic acids.

The tissues of human origin used may be very diverse, but it is obvious to use tissues which are at general disposal such as placentas or blood leucocytes.

The invention is illustrated by, but not limited to, the following examples.

PROCESSES OF PREPARATION

Example 1

(a) Grinding placentas.—After removal, the placentas are washed in a physiological serum, then immediately frozen at $-20°$ C. The grinding is effected in the glass beaker of a Mixer of "Turmix" type into which are successively introduced different elements in the following proportions:

100 g. of frozen tissue previously cut up into small pieces,
200 ml. of trishydroxymethyl-aminomethane buffer (referred to hereinafter as Tris) —HCl $10^{-2}$ M pH 7.3, $MgCl_2$ $10^{-2}$ M,
0.25% of a product marketed under the name of Cemulsol NPT6 as a surface-active agent,
300 ml. of phenol saturated (by the above Tris, $MgCl_2$ buffer) with the addition just before use of 1% of 8-hydroxyquinoline. This last mixture will be referred to hereinafter as "phenol 76%."

The tissue is ground three times for 1 minute with 1 minute intervals. This operation is repeated 10 times for the grinding of 1 kg. of placenta. The homogeneous material obtained is treated with 0.3% of sodium dodecylsulphate and extracted to obtain the RNA.

(b) Preparation of the RNA.—The above emulsion is subjected to 3 successive extractions at 4° C.

First extraction: agitation for one hour, centrifuging for 15 minutes at 2000 r.p.m., withdrawal of the aqueous phase and of the intermediate phase; the residue from the centrifuging is put aside.

Second extraction: Addition of an equal volume of "phenol 76%" to the preceding aqueous and intermediate phases, agitation of the suspension for 45 minutes, centrifuging, and withdrawal of the aqueous phase only.

Third extraction: Addition of half a volume of "phenol 76%" to the preceding aqueous phase, agitation of the suspension for 30 minutes, centrifuging, withdrawal of the aqueous phase.

The nucleic acids are precipitated from the final aqueous phase by the addition of 2 volumes of ethanol in the presence of 0.1 M NaCl. After complete precipitation (4 to 16 hours at $-20°$), the residue is centrifuged, dissolved in NaCl $10^{-3}$ M, then reprecipitated by 2 volumes of ethanol. It is kept at $-20°$ C.

The nucleic acids thus obtained contain 75–80% of RNA and 20–25% of DNA. The latter is eliminated by the action of deoxyribonuclease under the following conditions: the precipitate formed by the nucleic acids is dissolved in a minimum of buffer Tris-HCl $10^{-2}$ M, $MgCl_2$ $10^{-2}$ M at pH 7.3. The deoxyribonuclease acts at the rate of 0.1 µg./ml. at 4° C. for 20–30 minutes; after cooling the solution in melting ice, it is extracted by half a volume of "phenol 76%" with the object of eliminating the enzymic proteins. Finally the RNA is precipitated from the aqueous phase by the addition of 2 volumes of ethanol in the presence of 0.1 M NaCl. The precipitate of RNA is washed successively 2 or 3 times with an ethanol-water mixture (70:30 v./v.) to remove traces of phenol.

(c) Methylation.—0.05 volume of 8 M potassium acetate is added with caution and with agitation to a solution of the nucleic acids thus obtained in NaCl $10^{-3}$ M, so as to obtain a 0.4 M solution in potassium acetate. The redistilled methyl sulphate has been added in the proportion of 4 moles per nucleotide. Since the reaction is not immediate, it is allowed to continue for 22 hours at 4° C. When the reaction is finished, the methylated nucleic acids are precipitated by 2 volumes of ethanol in the presence of 2% of potassium acetate. The precipitate is centrifuged and washed twice with the ethanol-0.1 M NaCl mixture (2:1 v./v.), then redissolved in $10^{-3}$ M NaCl. The solution obtained containing 1 to 2 mg./ml. of methylated RNA is dialysed against water at 4° C. for 16 to 24 hours, then lyophilised.

Examples 2 to 4

The procedure is as in Example 1, but instead of the 4 moles of methyl sulphate per nucleotide referred to in the last paragraph of Examples 1, 2, 6, and 8 moles per nucleotide are respectively used.

Example 5

The residue after centrifuging obtained during the first extraction of the RNA by phenol in Example 1, and which was put aside, is suspended in a Tris-HCl $10^{-2}$ M pH 7.3, $MgCl_2$ $10^{-2}$ M buffer, at the rate of 500 ml. for a residue corresponding to 100 g. of tissue. 2.5% of sodium dodecylsulphate are added and the mixture is stirred vigorously for 5 to 10 minutes. The viscous suspension is subjected to two phenolic extractions at the ambient temperature.

First extraction: Addition of 1 volume of "phenol 76%," agitation for 1 hour, centrifuging, withdrawal of the aqueous phase.

Second extraction: Addition of half a volume of "phenol 76%," agitation for 30 minutes, centrifuging and withdrawal of the aqueous phase.

The DNA is precipitated by the addition of 2 volumes of ethanol to the final aqueous phase; the fibres are collected, washed successively in ethanol at 75°, 85° and 95° and dissolved in NaCl $10^{-3}$ M. The solution obtained shows a turbidity which is due to the presence of glycogen. The latter is eliminated by centrifuging for 2 hours at 105,000 g.

The solution of DNA thus prepared is contaminated with 5-7% of proteins. These are reduced to less than 0.5% by 2 successive treatments with a chloroform-isoamyl alcohol mixture (24:1 v./v.). The ionic concentration of the solution containing 0.5-1 mg. of DNA per ml. is raised to 0.1 M of NaCl. It is then agitated for 15 minutes with half a volume of chloroform-isoamyl alcohol mixture. After centrifuging for 5 minutes at 2000 r.p.m., the upper aqueous phase is removed and subjected to a second treatment effected under the same conditions. Finally, the fibres of DNA are reprecipitated by the addition of 2 volumes of ethanol to the final aqueous phase. The DNA thus obtained is methylated like the RNA in Example 1, but the fibres are collected and successively washed in ethanol at 75°. 85° and 95° before being redissolved in NaCl $10^{-3}$ M, and is then dialysed against NaCl $10^{-3}$ M. After a new precipitation with 2 volumes of ethanol, the fibres are collected and placed in a desiccator for 24 hours.

Example 6

Ribonucleic acids are prepared as in Example 1. They are then converted into trimethylhexadecylammonium salts under the following conditions: One volume of a solution of trimethylhexadecylammonium bromide is added to one volume of the solution of nucleic acids in NaCl $10^{-3}$ M so as to add a quantity slightly greater than the stoichiometric amount. After 5 minutes of careful agitation, the precipitate obtained is centrifuged, then washed three times by centrifuging with 2 volumes of water in order to eliminate the excess ammonium salt. The undried precipitates of quaternary ammonium nucleates are then dissolved in 2 volumes of dimethylformamide by a violent mechanical agitation (which enables a solution containing 0.5 to 1 mg. of nucleic acids per ml. to be obtained). Then 10 moles of allyl bromide per nucleotide are added and after stirring, the mixture is left for 22 hours at 4° C.

The allyl nucleic acids are then precipitated by 2 volumes of ethanol in the presence of 2% of potassium acetate. The precipitate is centrifuged and washed twice with an ethanol-0.1 M NaCl mixture (2:1 v./v.) and then redissolved in NaCl $10^{-3}$ M. The solution obtained containing 1 to 2 mg./ml. of RNA is dialysed against water at 4° C. for 16 to 24 hours, then lyophilised.

Examples 7 and 8

The procedure is as in Example 6, but instead of the 10 moles of allyl bromide per nucleotide referred to in the last paragraph of Example 6, 50 and 60 moles per nucleotide are respectively used.

Example 9

The DNA acids are prepared as in Example 5. These are allylated as in Example 6, but the fibres are collected and washed successively in ethanol at 75°, 85° and 95° before being redissolved in $10^{-3}$ M NaCl, then dialysed against $10^{-3}$ M NaCl. After a new precipitation by 2 volumes of ethanol, the fibres are collected and placed in a desiccator for 24 hours.

Example 10

Calculated quantities, equal in volume, of tributylamine, dioxan and acetic anhydride are added to a solution of RNA in dimethyl formamide prepared as in Example 6, so as to have 30 moles of acetic anhydride reagent per nucleotide. After agitation, the mixture is left for 20 hours at the ordinary temperature (20° C.). When the reaction period is over, the sodium salts of the acetylated nucleic acids are precipitated from the organic solutions by the addition of a solution of 3M NaCl (1/10 of the total volume). After centrifuging, the residue is washed twice with an ethanol-0.1 M NaCl mixture (2:1 v./v.), then redissolved in NaCl $10^{-3}$ M. The solution obtained is dialysed against water at 4° C., then lyophilised.

Examples 11 and 12

The procedure is as in Example 10, but instead of 30 moles of acetic anhydride, 10 and 15 moles respectively of this reagent are used with equal volumes of tributylamine and dioxan.

Example 13

0.1 volume of 2.5 M sodium acetate, pH 4.3, is added with caution and while stirring to a solution of RNA in $10^{-3}$ M NaCl obtained as in Example 1 (so as to obtain a 0.25 M solution). The RNA is then treated with 0.1 volume of a solution prepared just before use of 3 M sodium nitrite. The reaction mixture is stirred for 24 hours at the ambient temperature. The modified nucleic acids are precipitated by 2 volumes of ethanol in the presence of 2% of potassium acetate. The precipitate is centrifuged and washed tiwce with an ethanol-0.1 M NaCl mixture (2:1 v./v., then redissolved in $10^{-3}$ M NaCl. The solution obtained, containing 1 to 2 mg. of RNA per ml, is dialysed against water at 4° C. for 16 to 24 hours, then lyophilised.

Example 14

The procedure is as in Example 13, but the 0.1 volume used is replaced by a 3 M solution of sodium nitrite per 0.2 volume of this same solution.

Example 15

The operation is as in Example 13, but the solution of RNA used is replaced by a solution of DNA in $10^{-3}$ M NaCl obtained as in the first part of Example 5. The fibres are collected and washed successively in ethanol at 75°, 85° and 95° before being redissolved in $10^{-3}$ M NaCl, then dialysed against $10^{-3}$ M NaCl. After a further precipitation by 2 volumes of ethanol, the fibres are collected and placed in a desiccator for 24 hours.

Example 16

A solution of RNA in $10^{-3}$ M NaCl obtained according to the process of Example 1 is given as buffer $10^{-2}$ M of phosphate pH 7 and $10^{-2}$ M of $Mg^{++}$. An aqueous solution of monoperphthalic acid is added, the mixture is adjusted to pH 7 and contains 2.5 moles of monoperphthalic acid per mole of nucleotide, and the oxidation reaction is allowed to continue for 5 hours at 22° C. When the reaction is finished, the modified nucleic acids are precipitated by 2 volumes of ethanol in the presence of 2% of potassium acetate. The precipitate is centrifuged and washed twice with an ethanol-0.1 M NaCl mixture (2:1 v./v.), then redissolved in $10^{-3}$ M NaCl. The solution obtained, containing 1 to 2 mg. of modified RNA per ml. is dialysed against water at 4° C. for 16 to 24 hours and then lyophilised.

Examples 17 and 18

The procedure is as in Example 16, but 7 and 11.5 moles respectively of monoperphthalic acid are used instead of 2.5 moles.

Example 19

A DNA obtained according to the process described in the first part of Example 5 is oxidised by monoperphthalic acid as in Example 16, and the experiment is finished as in Example 15.

Example 20

A solution of trimethylhexadecylammonium ribonucleate in dimethyl formamide obtained by the process described in Example 6 is dehydrated by passage over sodium silicoaluminate. A quantity of bromine, previously dissolved in dimethylformamide, is added, corresponding to one mole of bromine per nucleotide. After 30 seconds to 1 minute of reaction, the regeneration of the modified sodium ribonucleate is effected with a solution of NaBr in dimethyl formamide (¼ of the total volume) in order to avoid the introduction of water into the reaction medium. After centrifuging, the residue is washed twice with an ethanol-0.1 M NaCl mixture (2:1 v./v.), then redissolved in $10^{-3}$ M NaCl. The solution obtained is dialysed against water and then lyophilised.

Examples 21 and 22

The procedure is as in Example 20, but 0.5 and 4 moles respectively of bromine are used per nucleotide.

Examples 23, 24 and 25

The procedure is as in Example 20, but the bromine is replaced by N-chloro-succinimide and 1, 5 or 15 moles of N-chlorosuccinimide are used per nucleotide. The sodium salts of the modified RNA, however, are regenerated by aqueous solutions of 3 M NaCl (⅒ of the total volume) rather than by an organic solution of NaBr.

After regeneration of the sodium salts of the nucleic acids, the latter are centrifuged. The residues are washed twice with an ethanol-0.1 M NaCl mixture (2:1 v./v.) then redissolved in $10^{-3}$ M NaCl. The solutions obtained are dialysed against the water and then lyophilised.

Example 26

Iodine chloride in solution in dimethyl formamide is added to a solution of RNA in the same solvent, obtained as in Example 6, at a concentration of 2 moles of ICl per nucleotide in the reaction mixture. After reacting for 2 hours at 4° C., the RNA is regenerated from the organic solution by the addition of a solution of 3 M NaCl (⅒ of the total volume). After centrifuging, the residue is washed twice with an ethanol-0.1 M NaCl mixture (2:1 v./v.), then redissolved in $10^{-3}$ M NaCl. The solution obtained is dialysed against water at 4° C. and then lyophilised.

Examples 27 and 28

The procedure is as in Example 26, but using 4 and 6 moles respectively of ICl per nucleotide.

Physicochemical and analytical characteristics

The nucleic acid extracts from human tissues are soluble in $10^{-3}$ M NaCl. Solution of the RNA is easy, and that of the DNA requires a gentle agitation and a minimum time of 48 hours for solution. When the nucleic acids are dissolved, it is possible without difficulty to raise the ionic concentration of the solutions (for example up to 0.2 M of NaCl, citrate, etc.). The maximum solubilities are as follows:

RNA: 5 mg./ml. Beyond this it is a question of suspensions

DNA: from a concentration of 500 μg./ml. onwards, the solutions are viscous

Studies have shown that the molecular integrity of the nucleic acids (modified heterologues or homologues) was not indispensable to produce an inhibiting effect against the viral infection. Other work, notably that of Kawade and Ujihara (Nature, 1969, 221, 569), shows that the RNA having undergone an alkaline hydrolysis or the mixtures of mononucleotides are inactive. These facts indicate that a certain polyribonucleotide structure is necessary for the manifestation of the biological activity which is sought. The RNA and DNA of the placenta have been subjected to various methods of control.

(a) Spectrophotometric method.—The RNA and DNA extracts from the placenta show an absorption spectrum in the ultraviolet which is characteristic of the nucleic acids, i.e. they show a minimum absorption at 230 mμ and a maximum absorption at 260 mμ. The ratios of the optical densities $$\frac{\text{OD at 280 m}\mu}{\text{OD at 260 m}\mu}$$

are also in accord with the values generally admitted for the nucleic acids.

(b) Ultracentrifuging.—Determination of the sedimentation constants: The sedimentation constant is directly connected with the molecular mass and it depends on the dimensions of the particle in solution. Measures of the coefficients of sedimentation (S) have been made by using the method of absorption in UV with cells in KelF.

Centrifuging of the nucleic acids in a linear gradient of concentration in saccharose: the solutions of nucleic acids deposited at the surface of a saccharose gradient, then centrifuged, migrate at different speeds according to the mass and the shape of their molecules. Centrifuging has been carried out in a preparative ultracentrifuge for 16 hours at 4° with linear gradients of concentration of saccharose from 20 to 5 p.100.

The RNA show a polydisperse profile corresponding to molecules which possess sedimentation constants between 30 and 4 S.

The DNA appear in the form of characteristic single peaks which sediment essentially between the concentrations of 9% to 13% in saccharose. The measurements of analytical ultracentrifuging allow a constant of sedimentation of about 15 S to be attributed to the DNA.

Analysis of the modified nucleic acids

The analysis of the chemically modified RNA and DNA has been effected by bidimensional chromatography on Whatman 1 paper. The process of hydrolysis and the solvents used are variables according to the modification considered. The nature and the proportion of the chemical modifications obtained as a function of the number of moles of reagent introduced into the reaction medium are given in the table. According to the nature and the proportion of the chemical modification, a more or less great destabilisation of the secondary structure visible by alteration of the fusion curves is observed. For very high proportions of modification, fissions of the molecule of nucleic acid are present. The solubility characteristics of the modified nucleic acids are identical with those of the unmodified RNA and DNA.

[The Nature and proportion of the chemical modifications obtained with the RNA and DNA extracts of human placentas as a function of the number of moles of reagent introduced into the reaction medium in aqueous medium]

| Modification | Moles of reagent per nucleotide | Nature and percentage of the bases affected | | |
|---|---|---|---|---|
| | | Adenine | Guanine | Cytosine |
| | | 1-methyl-adenine | 7-methyl-guanine | 3-methyl-cytosine |
| Methylation by methyl sulphate | 2 | Traces | 10 | |
| | 4 | 5–12 | 15–25 | Traces |
| | 6 | 10–15 | 20–30 | Traces |
| | 8 | 45–55 | 17 | 8–12 |
| | | Hypoxanthine | Xanthine | Uracil |
| Deamination by nitrous acid | 50 | 1–2 | 1–2 | 2 |
| | 100 | 3–4 | 3–4 | 4–5 |
| | | 1-hydroxy-adenine (A) destruction of the adenine (B) | Destruction of the guanine | 1-hydroxy-cytosine (C) destruction of the cytosine (D) |
| | | A    B | | C    D |
| Oxidation by monoperphthalic acid | 2.5 | 16    14 | 13 | 5    9 |
| | 7 | 27    22 | 29 | 12    17 |
| | 11.5 | 34    23 | 34 | 16    18 |

[Nature and proportion of the chemical modifications obtained with the RNA and DNA extracts of human placentas, as a function of the number of moles of reagent introduced into the reaction medium in dimethyl formamide medium]

| Modification | Moles of reagent per nucleotide | Nature and percentage of the bases affected | | |
|---|---|---|---|---|
| | | Guanine | Cytosine | Uracil (in the case of the RNA) |
| | | 8-bromo-guanine | 5-bromo-cytosine | 5-bromo-uracil |
| Bromination with bromine | 1 | 30–35 | 5–10 | 13 |
| | 4 | 70–80 | 20–35 | 80 |
| | | Destruction | | 5-chloro-uracil |
| Chlorination with N-chlorosuccinimide | 1 | 2–4 | | |
| | 5 | 25 | | 2–3 |
| | 15 | 35 | | 20 |
| | | | | 5-iodo-6-hydroxy-5,6-dihydro-uracil |
| Iodination with iodine chloride | 1 | | | 7 |
| | 2 | | | 40 |
| | 4 | | | 55 |
| | | 7-allyl-guanine | | |
| Allylation with allyl bromide | 10 | 4–6 | | |
| | 50 | 6 | | |
| | 60 | 8 | | |
| | | | 6-acetyl-cytosine | |
| Acetylation with acetic anhydride | 10 | | 53 | |
| | 15 | | 62 | |
| | 30 | | 65 | |

The results are expressed by the ratio:
$$\frac{\text{mole of modified base}}{\text{mole of intact base plus mole of modified base}} \times 100$$

The thymine in the case of the DNA is not affected in the course of the reactions carried out.

Pharmacological properties

The toxicity of the modified RNA and DNA has been studied on the methylated RNA of human placenta, methylated DNA of human placenta and a mixture made up of 75% of methylated RNA of human placenta and 25% of methylated DNA of human placenta.

Given orally, the three products have been administered in suspension in a 10% mucilage of gum arabic. The modified DNA of placental origin, after a coarse pulverisation, is insoluble in water at a concentration of 0.06%. On the other hand, the two other products have been put in aqueous solution in 48 hours at a concentration of 0.25% and the solutions have been rendered isotonic by the addition of NaCl immediately before the injections. In the case of mice, the nucleic acids, the methylated RNA and the methylated mixture "RNA plus DNA" are atoxic at a dose of 3000 mg./kg. taken orally at a dose of 125 mg./kg. taken intravenously. The methylated DNA of placental origin is atoxic at 1500 mg./kg. taken orally. Finally, whatever may be the method of administration, no symptomatology is induced by these modified nucleic acids in the case of mice.

By way of example, the action of some modified nucleic acids from the human placenta on various viruses and the formation of strong concentrations of interferon in the human leucocytes culture are indicated below.

(1) The nucleic acids extracted from the human placenta, then methylated at the rate of four moles of methyl sulphate per nucleotide in the reaction medium, inhibit the development of the vesicular stomatitis virus (V.S.V.) in the human diploid cells culture.

The tests were carried out as follows. Increasing doses of methylated ribonucleic acids from human placentas were introduced into a culture medium of a first explantation of cells from the kidneys of a human embryo, cultivated in a monocellular layer. Twelve hours later, the medium was removed and each bottle was inoculated with a quantity of the virus V.S.V. so that, in the control bottles in which nucleic acids had not been introduced, or else in which natural non-modified nucleic acids had been introduced, after twenty-four hours culture at 37° C., there are about fifty plaques of necrosis. It was thus found that the concentration of $200.10^{-6}$ g./ml. of methylated nucleic acids inhibited 95% of the viral development. The close concentration of $10.10^{-6}$ g./ml. still showed an inhibiting, but less marked, activity.

Identical results were obtained with a mixture of methylated ribonucleic and deoxyribonucleic acids in which these compounds were in the relative proportions of 70% and 30%.

(2) The nucleic acids extracted from the human placenta and then methylated at the rate of four moles of methyl sulphate per nucleotide in the reaction medium, induced in the human leucocytes culture the formation of strong concentrations of interferon.

2 ml. of total human blood collected on heparin were introduced into each tube of a series. Then 1 ml. of a solution of methylated ribonucleic acids from human placentas was added to each tube so that the final concentration varied from $750.10^{-6}$ g./ml. to $5.5.10^{-6}$ g./ml.

The tubes were placed in roller tubes for 18 hours at 37° C.

Then 7 ml. of a solution containing 9 g. of sodium chloride per 1000 ml. was added to each tube. The contents of each tube were centrifuged, and the residue was removed. The supernatant layer was dialysed for 24 hours at 4° C. against a glycocoll-HCl buffer of pH 2, and then for a further 24 hours against distilled water.

The testing of the interferon contained in these dialysed solutions was conducted by means of a system consisting of the vesicular stomatitis virus and a strain of polyploid cells isolated from human diploid cells of strain W 38. On the one hand, the V.S.V. produced in 24 hours at 37° C. plaques of necrosis on these cells, and on the other hand these cells could be armed against the virus V.S.V. by preparations of human interferon.

For each solution to be tested, using the culture medium for cells as diluent, dilutions of 1/40, 1/80, 1/160, 1/320 and 1/640 were made. 7 ml. of the dilution of interferon to be studied was introduced into a 75 cc. bottle, the surface of which was covered by cells sensitive to the V.S.V. virus. It was then kept at 37° C. for 18 hours. The liquid was then thrown out and 0.5 ml. of a dilution of V.S.V. virus was introduced such that the number of plaques observed after 24 hours at 37° C. in the control bottles not having received the interferon was about 100.

At the end of 30 minutes, 6.5 ml. of culture medium were added and the bottle was incubated for 24 hours at 37° C. when the number of plaques of necrosis was counted.

The strength of the interferon solution studied is expressed by the inverse of the strongest dilution which reduces by 50% the number of plaques with respect to the control.

Under these conditions it is observed that concentrations of methylated human nucleic acids introduced into the total human blood at concentrations greater than $11.10^{-6}$ g./ml. induce the formation of interferon. Concentrations equal or superior to $47.10^{-6}$ g./ml. show an identical inductive activity, the strength of interferon activity being generally 1/320.

Concentrations between $47.10^{-6}$ g./ml. and $11.10^{-6}$ g./ml. show a distinct, but less and less marked inductive activity.

The same observations have been made with the mixture (70%, 30%) of methylated human placental ribonucleic and deoxyribonucleic acids.

Example of therapeutic application

A 1% ointment of the lyophilsed product obtained by methylation with 4 moles of methyl sulphate of a mixture of 75% to 80% of RNA and 20% to 25% of DNA extracted from human placenta was prepared. This ointment was based on an excipient having the following composition:

| | Percent |
|---|---|
| Cetyl alcohol | 5 |
| Distilled water | 59.9 |
| Stearyl alcohol | 5 |
| Propyleneglycol | 10 |
| Polyoxyethylene glycol stearate | 10 |
| Polyethoxylated fatty alcohol | 10 |
| Methyl para-hydroxybenzoate | 0.1 |

Patients attacked by viral dermatosis (herpes, veneral growths, shingles) were treated with this ointment for 5 to 15 days; in 7 cases out of 20 the therapeutic effect was satisfactory.

I claim:
1. Medicament comprising 70% by weight of a chemically modified ribonucleic acid of human origin and 30% by weight of a chemically modified deoxyribonucleic acid of human origin, both acids chemically modified in their purine or pyrimidine bases by lower alkylation, allylation, lower acylation, deamination, oxidation or halogenation, said medicament effective for the prevention in humans of infection of viral origin when administered locally as an ointment or when administered intravenously.

2. Medicament of claim 1 in which the chemical modification is methylation by methyl sulfate to yield an acid containing 1-methyl-adenine, 7-methyl-guaine and 3-methyl-cytosine.

3. Medicament of claim 1 in which the chemical modification is deamination by nitrous acid to yield an acid containing hypoxanthine, xanthine and uracil.

4. Medicament of claim 1 in which the chemical modification is oxidation by monoperphthalic acid to yield an acid containing 1-hydroxy-adenine and 1-hydroxy-cytosine.

5. Medicament of claim 1 in which the chemical modification is bromination with bromine to yield an acid containing 8-bromo-guanine.

6. Medicament of claim 1 in which the chemical modification is chlorination with N-chloro-succinimide to yield an acid containing 5-chloro-uracil.

7. Medicament of claim 1 in which the chemical modification is iodonation with iodine chloride to yield an acid containing 5-iodo-6-hydroxy-5,6-dihydro-uracil.

8. Medicament of claim 1 in which the chemical modification is allylationw ith allyl bromide to yield an acid containing 7-allyl-guanine.

9. Medicament of claim 1 in which the chemical modification is acetylation with acetic anhydride to yield an acid containing 6-acetyl-cytosine.

References Cited

Hilleman, Arch. Intern. Med., vol. 126, pp. 109–124, July 1970.

RICHARD L. HUFF, Primary Examiner

U.S. Cl. X.R.

424—85